(12) United States Patent
Huth et al.

(10) Patent No.: US 10,808,576 B2
(45) Date of Patent: Oct. 20, 2020

(54) METHODS OF REPLACING SEALS IN EXHAUST FRAMES OF TURBINE SYSTEMS AND RELATED COMPONENTS

(71) Applicant: General Electric Company, Schenectady, NY (US)

(72) Inventors: Robert Edward Huth, Greenville, SC (US); Thomas Alan Mogle, II, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 673 days.

(21) Appl. No.: 15/425,063

(22) Filed: Feb. 6, 2017

(65) Prior Publication Data

US 2018/0223694 A1    Aug. 9, 2018

(51) Int. Cl.
| | | |
|---|---|---|
| *F01D 25/30* | (2006.01) | |
| *F01D 11/00* | (2006.01) | |
| *F02K 1/80* | (2006.01) | |
| *F02C 7/28* | (2006.01) | |

(52) U.S. Cl.
CPC ............ *F01D 25/30* (2013.01); *F01D 11/003* (2013.01); *F01D 11/005* (2013.01); *F02C 7/28* (2013.01); *F02K 1/805* (2013.01); *F05D 2230/80* (2013.01); *F05D 2240/55* (2013.01)

(58) Field of Classification Search
CPC ...... F01D 25/30; F01D 11/005; F01D 11/003; F05D 2230/80; F05D 2240/55; F02C 7/28; F02K 1/805; B23P 6/00; B23P 6/002; Y10T 29/49318; Y10T 29/49968
USPC ........................................... 415/214
See application file for complete search history.

(56) References Cited

U.S. PATENT DOCUMENTS

| | | |
|---|---|---|
| 5,699,947 A | 12/1997 | Cavallo et al. |
| 9,311,445 B2 | 4/2016 | Nanda |
| 9,316,153 B2 | 4/2016 | Patat et al. |
| 9,353,638 B2 | 5/2016 | Rathmann |
| 9,358,488 B2 | 6/2016 | Jarrier et al. |
| 2005/0097893 A1* | 5/2005 | Carper ............. F02K 1/12 60/771 |
| 2005/0274009 A1* | 12/2005 | Powers .............. B23K 1/0018 29/889.1 |
| 2016/0102578 A1* | 4/2016 | Leszczynski ........ F01D 11/005 415/214.1 |

* cited by examiner

*Primary Examiner* — Essama Omgba
*Assistant Examiner* — Stephen A Mick
(74) *Attorney, Agent, or Firm* — James Pemrick; Hoffman Warnick LLC

(57) ABSTRACT

Methods of replacing flex seals in exhaust frames of turbine systems are disclosed. The method may include removing a section of an outer casing of an exhaust frame to form an opening within the outer casing. The section may be formed within a flow path of the exhaust frame. The method may also include removing the flex seal from the exhaust frame via the opening formed within the outer casing, inserting a distinct flex seal within the exhaust frame via the opening formed within the outer casing, and covering the opening formed within the outer casing of the exhaust frame.

4 Claims, 14 Drawing Sheets

METHODS OF REPLACING SEALS IN EXHAUST FRAMES OF TURBINE SYSTEMS AND RELATED COMPONENTS

The disclosure relates generally to maintenance of turbine systems, and more particularly, to methods of replacing flex seals in exhaust frames of turbine systems and related components of the exhaust frames.

In conventional turbine systems exhaust housings or frames are typically attached or coupled to an outlet of a turbine component. These exhaust housings are attached to the turbine component to safely direct gases passing through and/or from the turbine component into the environment surrounding the turbine system, or alternatively, to direct the gases to another component that may utilize the gases for additional processes (e.g., a heat recovery steam generator). Conventional exhaust housings typically include two concentric shells coupled directly to the turbine component, and a flow path for the gases defined between the shells.

Conventional exhaust housings typically include components that are utilized to seal the exhaust housing with other components of the system (e.g., the turbine component), partially define a flow path between the concentric shells of the exhaust housing, and/or separate hot flow path air and cooling air flowing through the turbine system. For example, exhaust housings may include flex seals disposed therein to seal the exhaust housing and/or separate hot and cooling air flowing through the turbine system. However, these conventional flex seals typically require replacement before scheduled maintenance stoppages of the turbine system. Conventional processes for replacing these flex seals typically require the exhaust housing to be at least partially disassembled and/or uncoupled from the turbine component. However, this results in the turbine system being shut down for an extended period of time, requires additional time for reassembly and requires expensive machinery for removing and/or uncoupling the exhaust housing.

Other conventional processes include making cuts on a flange of the exhaust housing to expose the flex seal. However, the position of these cuts on the flange are difficult to make, and even more difficult to reattach (e.g., weld) the portion of the flange previously cut. As a result, the reattached portion may require more than one weld and/or may include an undesirable weld to reattach the cut portion of the flange. The undesirable weld may be incapable of withstanding the pressures, forces and/or high temperatures the exhaust housing may be exposed to during operation of the turbine system, and may need additional, unscheduled maintenance, which requires additional shutdown time of the turbine system.

BRIEF DESCRIPTION OF THE INVENTION

A first aspect of the disclosure provides a method for replacing a flex seal, including: removing a section of an outer casing of an exhaust frame to form an opening within the outer casing, the section formed within a flow path of the exhaust frame; removing the flex seal from the exhaust frame via the opening formed within the outer casing; inserting a distinct flex seal within the exhaust frame via the opening formed within the outer casing; and covering the opening formed within the outer casing of the exhaust frame.

A second aspect of the disclosure provides an exhaust frame of a turbine system. The exhaust frame including: an outer casing including: an opening formed through an interior surface of the outer casing; a plate covering the opening formed through the interior surface of the outer casing, the plate aligned planar with or directly on the interior surface of the outer casing; a pipe positioned adjacent the interior surface of the outer casing and extending circumferentially around the outer casing; and a flex seal positioned adjacent the interior surface of the outer casing, the flex seal extending circumferentially around the outer casing adjacent the pipe.

A third aspect of the disclosure provides a turbine system including: a turbine component including a turbine shell; and an exhaust frame coupled to the turbine shell of the turbine component, the exhaust frame including: an outer casing including: an opening formed through an interior surface of the outer casing; a plate covering the opening formed through the interior surface of the outer casing, the plate aligned planar with or directly on the interior surface of the outer casing; a pipe positioned adjacent the interior surface of the outer casing and extending circumferentially around the outer casing; and a flex seal positioned adjacent the interior surface of the outer casing, the flex seal extending circumferentially around the outer casing adjacent the pipe.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
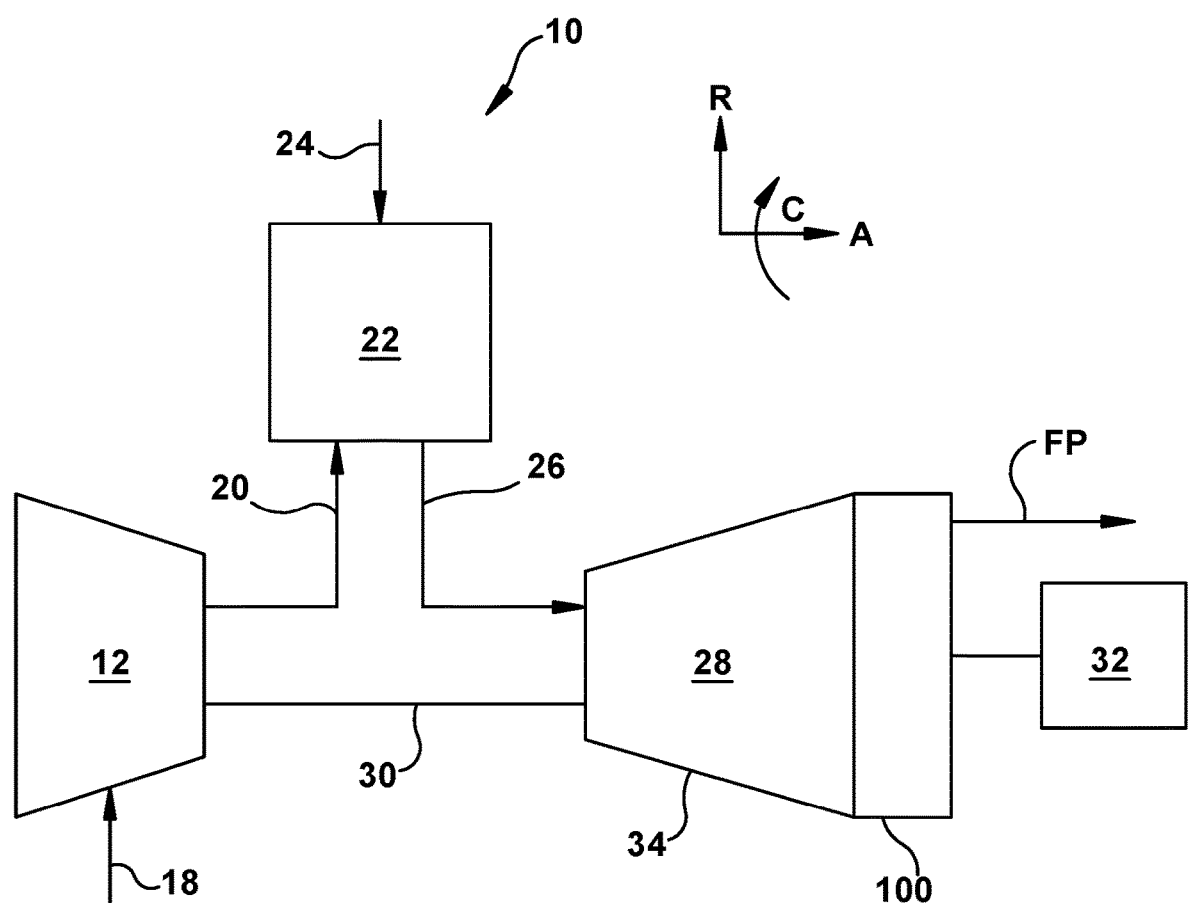
FIG. 1 depicts a schematic diagram of a gas turbine system according to embodiments.

As an initial matter, in order to clearly describe the current disclosure it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along an axis "R" (see, FIG. 1), which is substantially perpendicular with axis A and intersects axis A at only one location. Finally, the term "circumferential" refers to movement or position around axis A (e.g., axis "C").

The following disclosure relates generally to maintenance of turbine systems, and more particularly, to methods of replacing flex seals in exhaust frames of turbine systems and related components of the exhaust frames.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 shows a schematic view of gas turbine system 10 as may be used herein. Gas turbine system 10 may include a compressor 12. Compressor 12 compresses an incoming flow of air 18. Compressor 12 delivers a flow of compressed air 20 to a combustor 22. Combustor 22 mixes the flow of compressed air 20 with a pressurized flow of fuel 24 and ignites the mixture to create a flow of combustion gases 26. Although only a single combustor 22 is shown, gas turbine system 10 may include any number of combustors 22. The flow of combustion gases 26 is in turn delivered to a turbine 28, which typically includes a plurality of turbine blades or buckets and stator vanes. The flow of combustion gases 26 drives turbine 28 to produce mechanical work. The mechanical work produced in turbine 28 drives compressor 12 via a shaft 30 extending through turbine 28, and may be used to drive an external load 32, such as an electrical generator and/or the like.

Gas turbine system 10 may also include an exhaust frame 100. As shown in FIG. 1, exhaust frame 100 may be positioned adjacent turbine 28 of gas turbine system 10. More specifically, exhaust frame 100 may be positioned adjacent to turbine 28 and may be positioned substantially downstream of turbine 28 and/or the flow of combustion gases 26 flowing from combustor 22 to turbine 28. As discussed herein, a portion (e.g., outer casing) of exhaust frame 100 may be coupled directly to an enclosure or shell 34 of turbine 28.

Subsequent to combustion gases 26 flowing through and driving turbine 28, combustion gases 26 may be exhausted, flow-through and/or discharged through exhaust frame 100 in a flow path (FP). In the non-limiting example shown in FIG. 1, combustion gases 26 may flow through exhaust frame 100 in the flow path (FP) and may be discharged from gas turbine system 10 (e.g., to the atmosphere). In another non-limiting example where gas turbine system 10 is part of a combined cycle power plant (e.g., including gas turbine system and a steam turbine system), combustion gases 26 may discharge from exhaust frame 100, and may flow in the flow path (FP) into a heat recovery steam generator of the combined cycle power plant.

Figure 2:
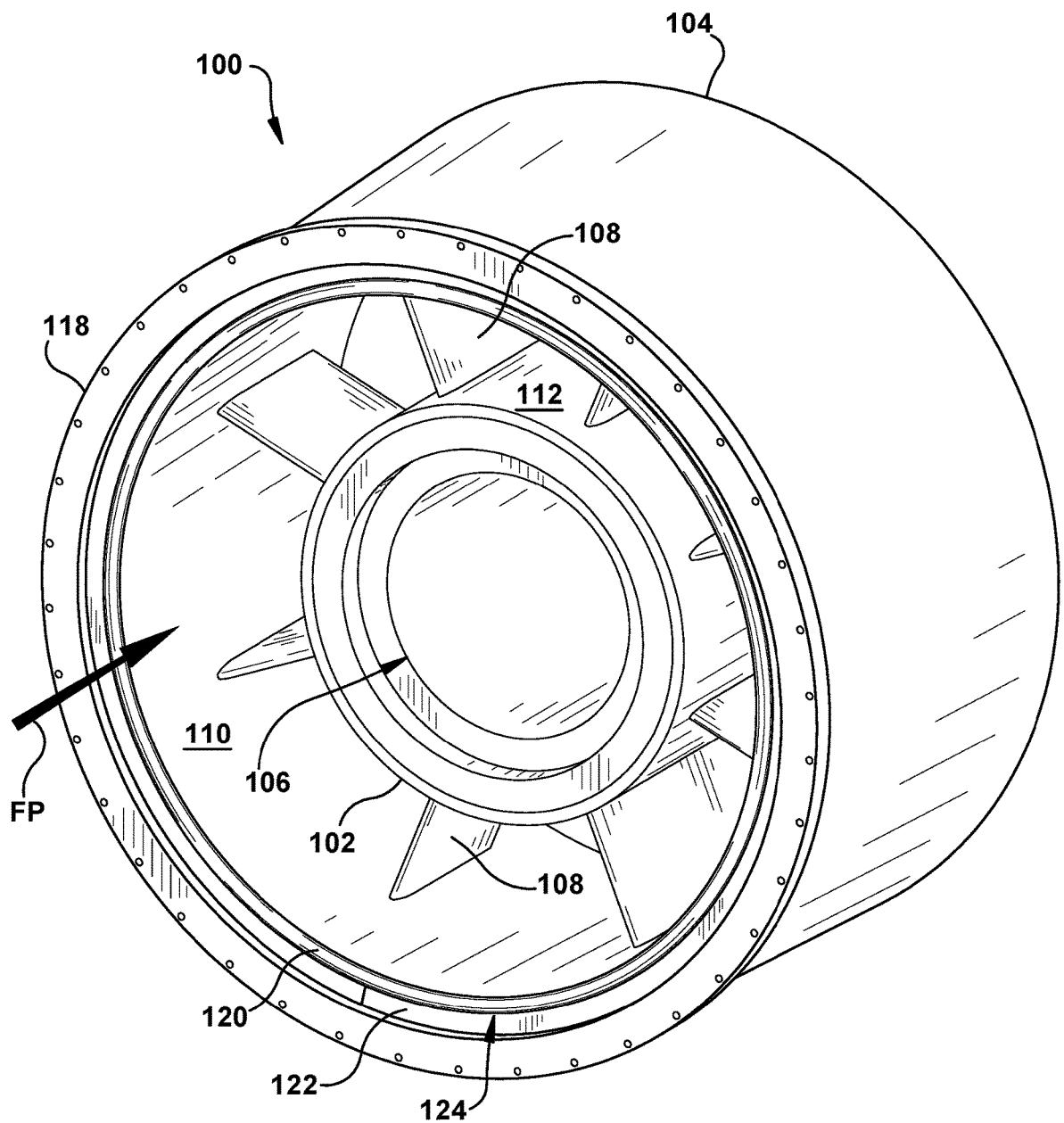
FIG. 2 depicts an isometric view of an exhaust frame including struts for the gas turbine system of FIG. 1, according to embodiments.

FIG. 2 depicts an isometric view of an example exhaust frame 100 of gas turbine system 10. Exhaust frame 100 may include an inner casing 102 and an outer casing 104. Inner casing 102 may be positioned within, substantially surrounded by and/or concentric with outer casing 104. As shown in FIG. 2, inner casing 102 may be substantially annular and may include a channel 106 formed therein. In a non-limiting example, channel 106 of inner casing 102 may be configured to receive a portion of shaft 30 of gas turbine system 10 (see, FIG. 1). That is, a portion of shaft 30 of gas turbine system 10 may be positioned within and/or pass through channel 106 of inner casing 102 of exhaust frame 100. In the non-limiting example, shaft 30 may be supported by inner casing 102 and may be free to rotate within channel 106 as turbine 28 of gas turbine system 10 is driven by the flow of combustion gases 26, as discussed herein. In another non-limiting example, channel 106 of inner casing 102 may receive a shaft support (not shown) that may be fixed within channel 106 of inner casing 102 and may be coupled to shaft 30 of gas turbine system 30. The shaft support fixed within the channel 106 in inner casing 102 of exhaust frame 100 may couple shaft 30 to inner casing 102 and may allow shaft 30 to freely rotate during operation of gas turbine system 10, as discussed herein.

Exhaust frame 100 may also include at least one strut 108 positioned between inner casing 102 and outer casing 104. In a non-limiting example, exhaust frame 100 may include a plurality of struts 108 circumferentially disposed between inner casing 102 and outer casing 104. As shown in FIG. 2, each strut 108 of exhaust frame 100 may extend radially between and may be coupled to each of inner casing 102 and outer casing 104. Struts 108 may be coupled to each of inner casing 102 and outer casing 104 using any suitable coupling technique including, but not limited to, mechanical fastening, welding, brazing, casting and the like. Additionally, the plurality of struts 108 of exhaust frame 100 may be positioned within a flow area of exhaust frame 100, defined between inner casing 102 and outer casing 104. Struts 108 of exhaust frame 100 may couple inner casing 102 and outer casing 104, and may provide support to exhaust frame 100 during operation of gas turbine system 10.

Outer casing 104 of exhaust frame 100 may be positioned around inner casing 102. Specifically, and as shown in FIG. 2, outer casing 104 may concentrically surround inner casing 102 of exhaust frame 100. Outer casing 104 may be substantially annular and may include an interior surface 110. Specifically, outer casing 104 may include an interior surface 110 of the body, shell or component forming outer casing 104. Outer casing 104 may at least partially define flow path (FP) for combustion gases 26 between outer casing 104 and inner casing 102. In the non-limiting example shown in FIG. 2, interior surface 110 of outer casing 104, along with exterior surface 112 of inner casing 102 may substantially define the flow path (FP) for exhaust frame 100 and/or for combustion gases 26 of turbine system 10 flowing through exhaust frame 100. As discussed herein, during operation of gas turbine system 10, combustion gases 26 may flow in a flow path (FP) into and/or through exhaust frame 100, and between interior surface 110 of outer casing 104 and exterior surface 112 of inner casing 102 before being exhausted from exhaust frame 100. Briefly returning to FIG. 1, and with continued reference to FIG. 2, outer casing 104 may also include a flange 118 that may couple outer casing 104 and/or exhaust frame 100 directly to shell 34 of turbine 28. When coupled to shell 34 of turbine 28 via flange 118, outer casing 104 may substantially and/or concentrically surround a portion of shaft 30 positioned within and/or received by inner casing 102.

As shown in FIG. 2, outer casing 104 of exhaust frame 100 may also include a seal retaining pipe 120 (hereafter "pipe 120"). Pipe 120 may be positioned adjacent to interior surface 110 of outer casing 104. Specifically, pipe 120 may be positioned adjacent to interior surface 110 and may be positioned between interior surface 110 of outer casing 104 and turbine shell 34 of turbine 28 (see, FIG. 1) when exhaust frame 100 is coupled to shell 34. In non-limiting examples, pipe 120 may be coupled directly to the body, shell or component forming interior surface 110 of outer casing 104, or may be coupled to a distinct component of outer casing 104. Additionally, at least a portion of pipe 120 may be in planar alignment with interior surface 110 of outer casing 104. Pipe 120 may also be positioned adjacent to flange 118 of exhaust frame 100, and may extend circumferentially around outer casing 104, interior surface 110 of outer casing 104 and/or flow path (FP) of exhaust frame 100. In a non-limiting example shown in FIG. 2, pipe 120 extends circumferentially around outer casing 104 may also be substantially concentric with flange 118 and/or interior surface 110 of outer casing 104. Although not shown as being coupled to shell 34 of turbine 28, pipe 120 may be accessible and/or substantially exposed when exhaust frame 100 and/or outer casing 104 are coupled to shell 34.

Pipe 120 may be formed from any suitable material that is capable of withstanding the pressures, forces and/or high temperatures exhaust frame 100 is exposed to during operation of turbine system 10. For example, pipe 120 may be formed from metal, metal alloys, plastic, ceramic or any other material having desirable characteristics as discussed herein. Pipe 120 of outer casing 104 may aid in sealing exhaust frame 100 with shell 34 of turbine 28, partially defining flow path (FP) between inner casing 102 and outer casing 104, and/or separating hot flow path air and cooling air flowing through turbine system 10.

Outer casing 104 of exhaust frame 100 may also include a flex seal 122. Flex seal 122 of outer casing 104 may be positioned adjacent interior surface 110 of outer casing 104. Specifically, flex seal 122 may be positioned adjacent to and/or radially below interior surface 110 of outer casing 104. Similar to pipe 120, flex seal 122 may be positioned between interior surface 110 of outer casing 104 and turbine shell 34 of turbine 28 (see, FIG. 1) when exhaust frame 100 is coupled to shell 34. Flex seal 122 may also extend circumferentially around outer casing 104, interior surface 110 of outer casing 104 and/or flow path (FP) of exhaust frame 100, and may be substantially concentric with flange 118, interior surface 110 and/or pipe 120. In a non-limiting example shown in FIG. 2, flex seal 122 may be positioned substantially between, coupled to and/or held in place by flange 118 and pipe 120 of outer casing 104. In the non-limiting example, at least a portion of flex seal 122 may be positioned within an aperture 124 (see also, FIG. 4) formed in pipe 120 for aiding in the retention and/or positioning of flex seal 122 within outer casing 104 of exhaust frame 100. In a non-limiting example, flange 118 may also include an aperture and/or groove (not shown) for receiving, retaining and/or positioning flex seal 122 within outer casing 104. Flex seal 122 may be formed from any suitable material that is substantially flexible, pliable and/or elastic, and capable of withstanding the pressures, forces and/or high temperatures exhaust frame 100 is exposed to during operation of turbine system 10. For example, flex seal 122 may be formed from stainless steel, stainless steel alloys, Inconel, carbon steel alloys, steel based alloys coated with thermal barrier coatings (TBC) or any other material having desirable characteristics as discussed herein. Along with pipe 120, flex seal 122 of outer casing 104 may aid in sealing exhaust frame 100 with shell 34 of turbine 28, and/or separating hot flow path air and cooling air flowing through turbine system 10.

FIGS. 3-13 show isometric views of a portion of exhaust frame 100 of FIG. 2. Specifically, FIGS. 3-13 depict enlarged isometric views of a bottom, base and/or lower portion of outer casing 104 of exhaust frame 100 undergoing various, non-limiting examples of replacing flex seal 122 positioned within outer casing 104. Bottom, base and/or lower portion of outer casing 104 of exhaust frame 100 may include the lowest portion and/or portion of outer casing 104 that is (vertically) positioned closest to the ground and/or supports of turbine system 10 utilizing exhaust frame 100. It is understood that similarly numbered and/or named components may function in a substantially similar fashion. Redundant explanation of these components has been omitted for clarity.

Figure 3:
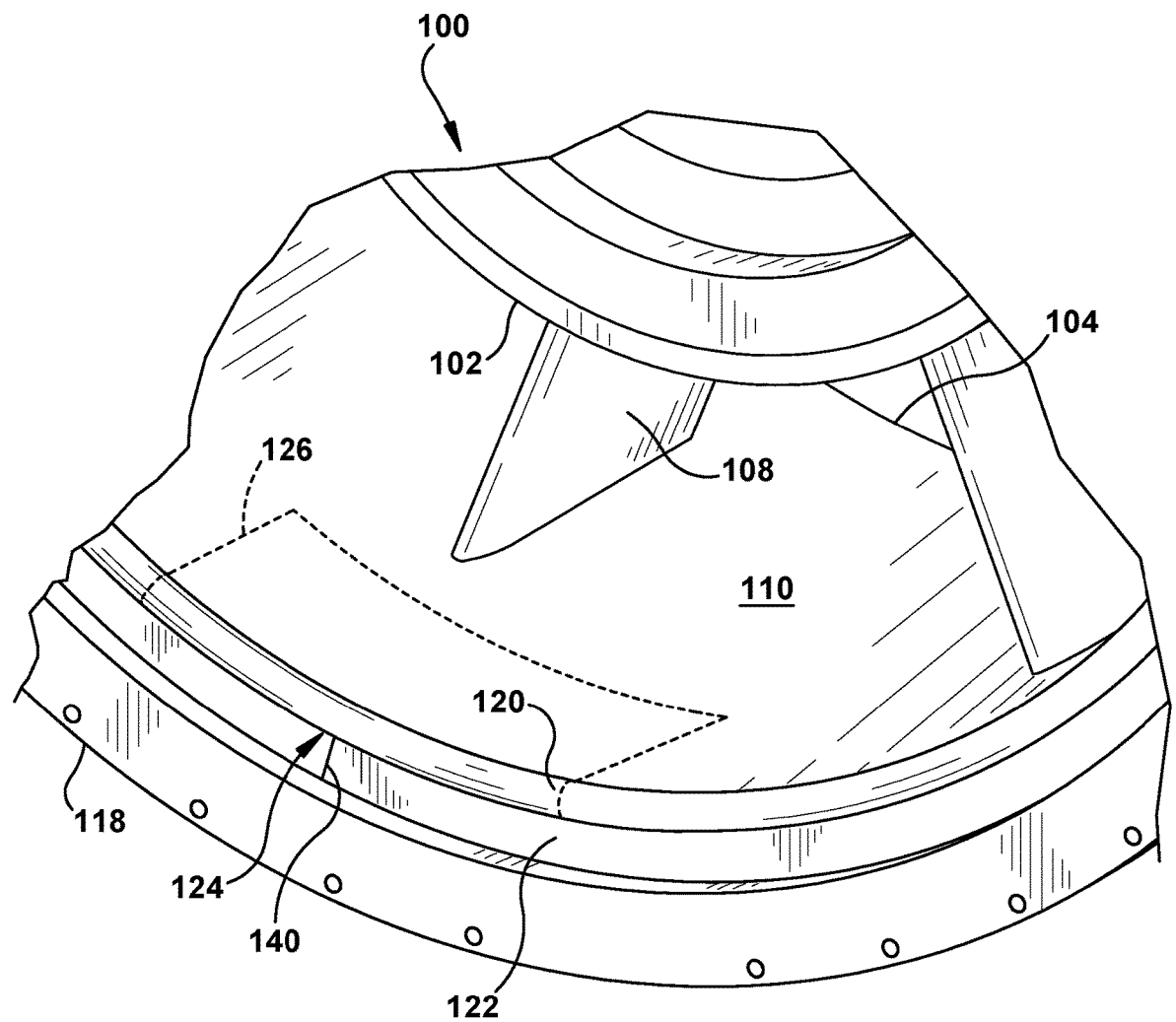
FIG. 3 depicts an enlarged isometric view of a bottom portion of the exhaust frame of the gas turbine system of FIG. 2, according to embodiments.

Turning to FIG. 3, a cut guide 126 (shown in phantom) is shown on exhaust frame 100. Specifically, cut guide 126 is shown, provided on and/or spans over a portion of interior surface 110 of outer casing 104 and pipe 120, respectively. As shown in FIG. 3, cut guide 126 may only extend (axially) over a portion of interior surface 110 of outer casing 104. As discussed herein, cut guide 126 may indicate a section (see, FIG. 4) of outer casing 104 that may be removed to expose at least a portion of flex seal 122. In a non-limiting example, cut guide 126 may be a visual template, guide and/or suggested cut area or pattern for a user to follow when performing the process of replacing flex seal 122, as discussed herein. As a result in the non-limiting example, cut guide 126 may not actually and/or physically be formed on interior surface 110 of outer casing 104. In another non-limiting example, cut guide 126 may actually and/or physically be formed on interior surface 110 of outer casing 104 and pipe 120, respectively. In this non-limiting example, cut guide 126 may be formed as a feature(s) (e.g., grooves, cut outs, recesses, reduced-material portions and the like) on interior surface 110 of outer casing 104 and pipe 120, respectively, to indicate to a user where cuts should be made when performing the process of replacing flex seal 122. Cut guide 126 actually and/or physically formed on interior surface 110 of outer casing 104 and pipe 120, respectively, may be formed prior to operation of turbine system 10, or alternatively, before performing subsequent processes of replacing flex seal 122, as discussed herein.

Figure 4:
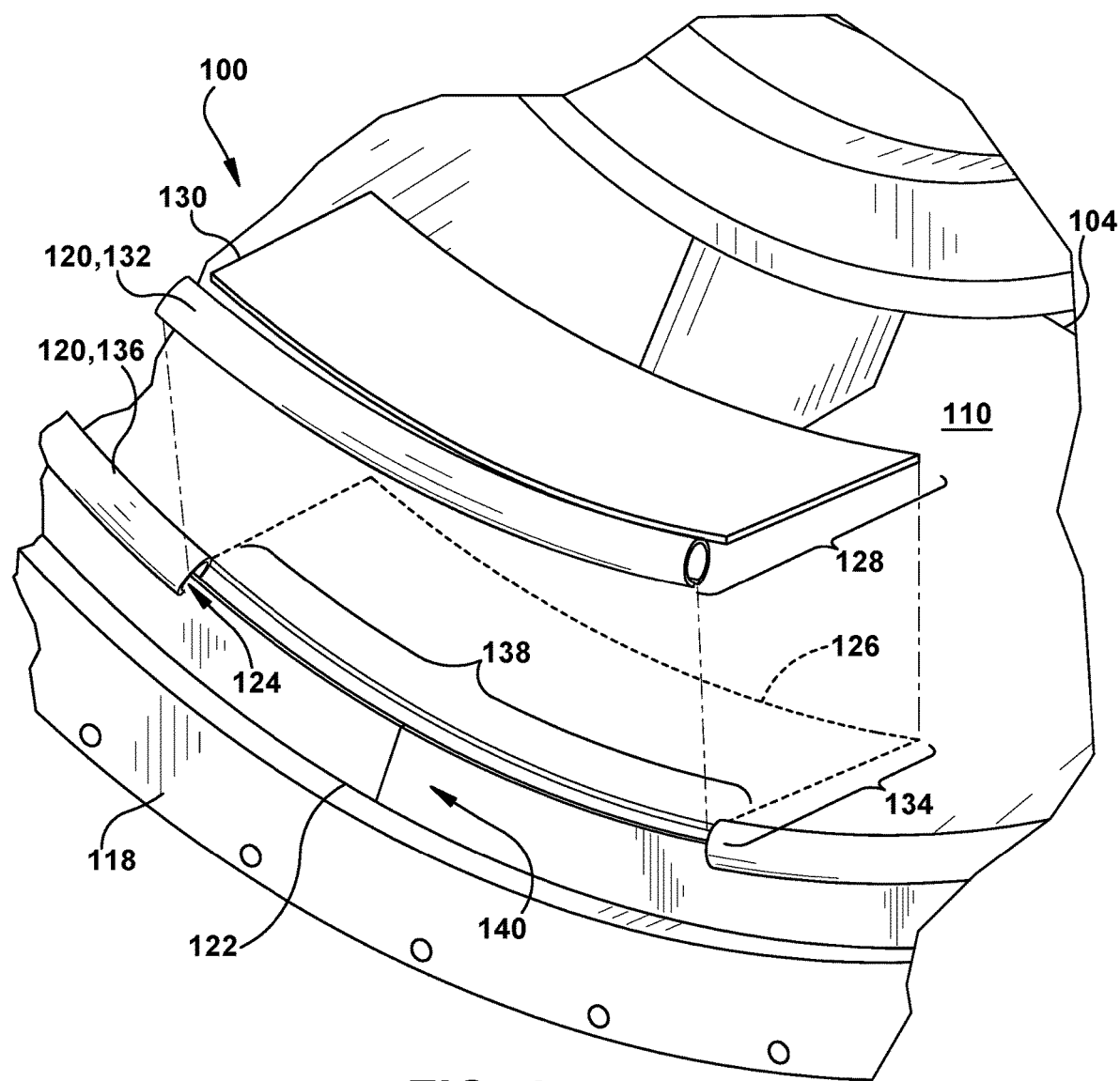
FIG. 4 depicts the bottom portion of the exhaust frame of FIG. 2 including a section of the outer casing removed to form an opening, according to embodiments.

FIG. 4 shows a section 128 of outer casing 104 of exhaust frame 100 removed from outer casing 104. Specifically, FIG. 4 shows outer casing 104 of exhaust frame 100 after a material remove and/or cutting process has been performed on interior surface 110 of outer casing 104 and pipe 120, respectively. As in the non-limiting example, section 128 of outer casing 104 may be formed by removing and/or cutting interior surface 110 and pipe 120, respectively, along cut guide 126 (shown in phantom). That is, forming and/or removing section 128 of outer casing 104 may include cutting interior surface 110 of outer casing 104 and cutting pipe 120 of outer casing 104. As such, section 128 of outer casing 104 removed from outer casing 104 may include a plate 130 or cut portion of the body, shell or component forming interior surface 110 of outer casing 104, and a cut portion 132 of pipe 120 of outer casing 104. As shown in FIG. 4, cut portion 132 of pipe 120 may be axially aligned with plate 130 formed from outer casing 104. As discussed herein, removed section 128 of outer casing 104, and more specifically plate 130 and cut portion 132 of pipe 120, may be set aside and reused in subsequent processes for replacing flex seal 122. Alternatively, and as discussed herein, after being removed and/or cut from outer casing 104, removed section 128 of outer casing 104, and more specifically plate 130 and cut portion 132 of pipe 120, may be discarded. Interior surface 110 of outer casing 104 and pipe 120 may be removed, sectioned and/or cut using any suitable material removal, cutting and/or cleaving technique including, but not limited to, grinding, milling, cutting, shearing and so on.

As shown in FIG. 4, removing and/or cutting section 128, and more specifically plate 130 and cut portion 132 of pipe 120, from outer casing 104 may form an opening 134 within outer casing 104. Opening 134 formed within outer casing 104 may include the opening, gap, space and/or void formed in interior surface 110 and the remaining, uncut portion 136 of pipe 120 of outer casing 104. As a result of removing and/or cutting section 128 and subsequently forming opening 134 in outer casing 104 of exhaust frame 100, a portion 138 of flex seal 122 may be completely exposed. Specifically, removing plate 130 of interior surface 110 and cut portion 132 of pipe 120 may completely expose and/or allow access to portion 138 of flex seal 122 positioned between flange 118 and pipe 120 in outer casing 104. In the non-limiting example shown in FIG. 4, exposed and/or accessible portion 138 of flex seal 122 axially aligned with opening 134 may otherwise (e.g., during operation) be positioned within, surrounded by and/or extend through aperture 124 formed in pipe 120, as discussed herein and depicted in FIG. 4 with reference to flex seal 122 and uncut portion 136 of pipe 120.

Flex seal 122 of outer casing 104 may also include a seam 140. Specifically as shown in FIG. 4, exposed and/or accessible portion 138 of flex seal 122 may include seam 140 that may separate and/or break the continuity of flex seal 122. As a result of seam 140 being formed and/or positioned on exposed and/or accessible portion 138 of flex seal 122, seam 140 may also be axially aligned with opening 134 formed in outer casing 104. In a non-limiting example, seam 140 may be formed and/or may exist prior to performing the removal and/or flex seal 122 replacement process discussed herein. That is, seam 140 of flex seal 122 may be formed as a result of inserting flex seal 122 into outer casing 104 of exhaust frame 100 prior to operating turbine system 10 utilizing flex seal 122. In another non-limiting example, seam 140 may be formed by a user performing the processes of replacing flex seal 122, as discussed herein. In this non-limiting example, seam 140 may be formed in flex seal 122 by cutting flex seal 122. Where seam 140 is formed by a user in flex seal 122 it is understood that a preexisting seam (not shown) may be formed and/or positioned elsewhere on flex seal 122.

Figure 5:
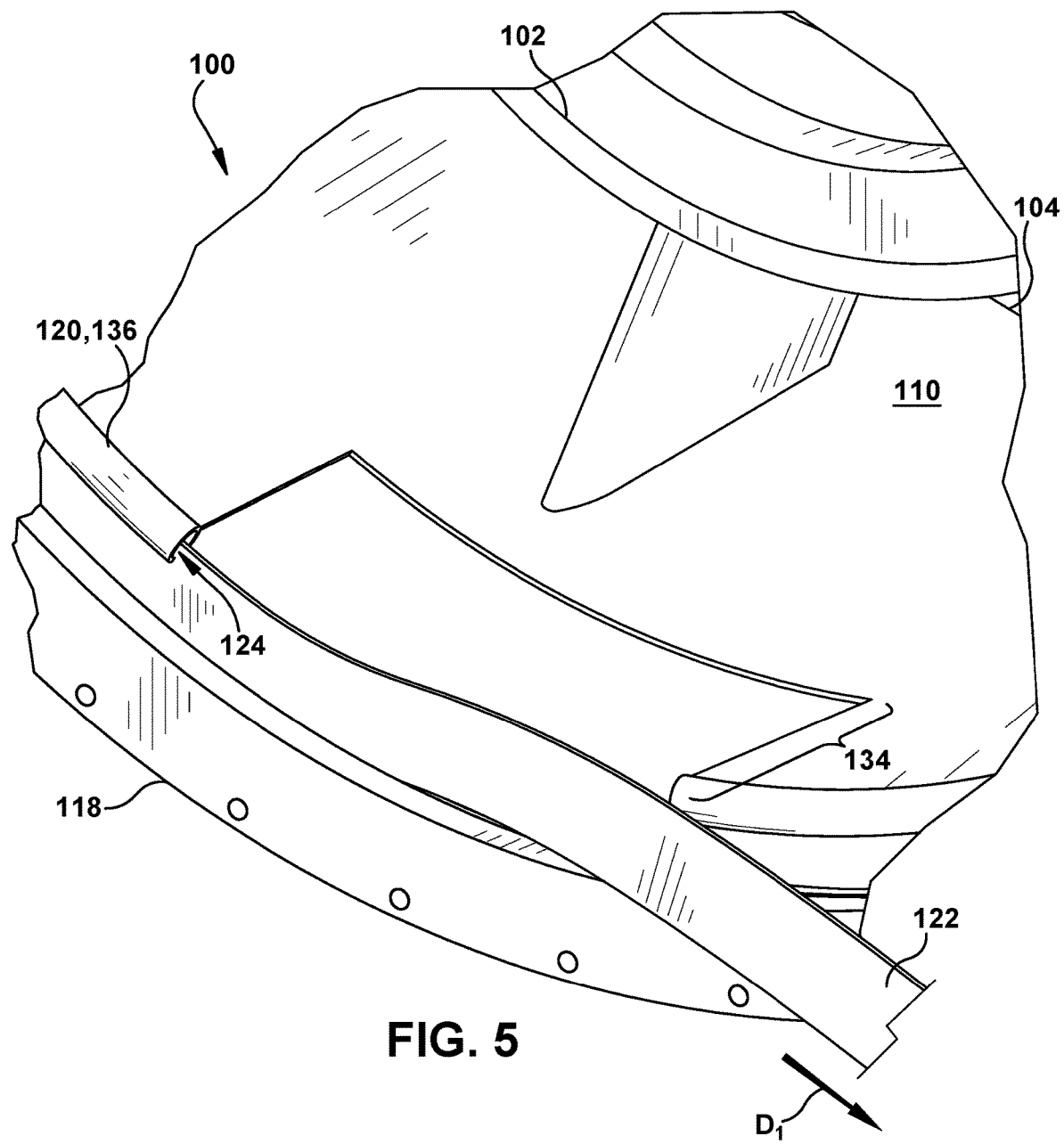
FIG. 5 depicts the bottom portion of the exhaust frame of FIG. 2 including an existing flex seal of the outer casing being removed, according to embodiments.

FIG. 5 shows flex seal 122 being removed from outer casing 104. Specifically, flex seal 122 may be removed from outer casing 104 via opening 134 formed within outer casing 104 of exhaust frame 100. As shown in FIG. 5, flex seal 122 may be removed from outer casing 104 via opening 134 by pulling on an end of flex seal 122 formed by seam 140 (see, FIG. 4) in a direction ($D_1$) substantially away from outer casing 104. That is, flex seal 122 may be removed from outer casing 104 by pulling flex seal 122 in a direction ($D_1$) until the entirety of flex seal 122 moves circumferentially around outer casing 104 and/or between flange 118 and uncut portion 136 of pipe 120, respectively, and out of opening 134 formed within outer casing 104. In the non-limiting example where flex seal 122 includes two distinct seams (e.g., seam 140 and not depicted seam), each half or portion of flex seal 122 may be removed individually by pulling flex seal 122 out of opening 134 as discussed herein.

Figure 6:
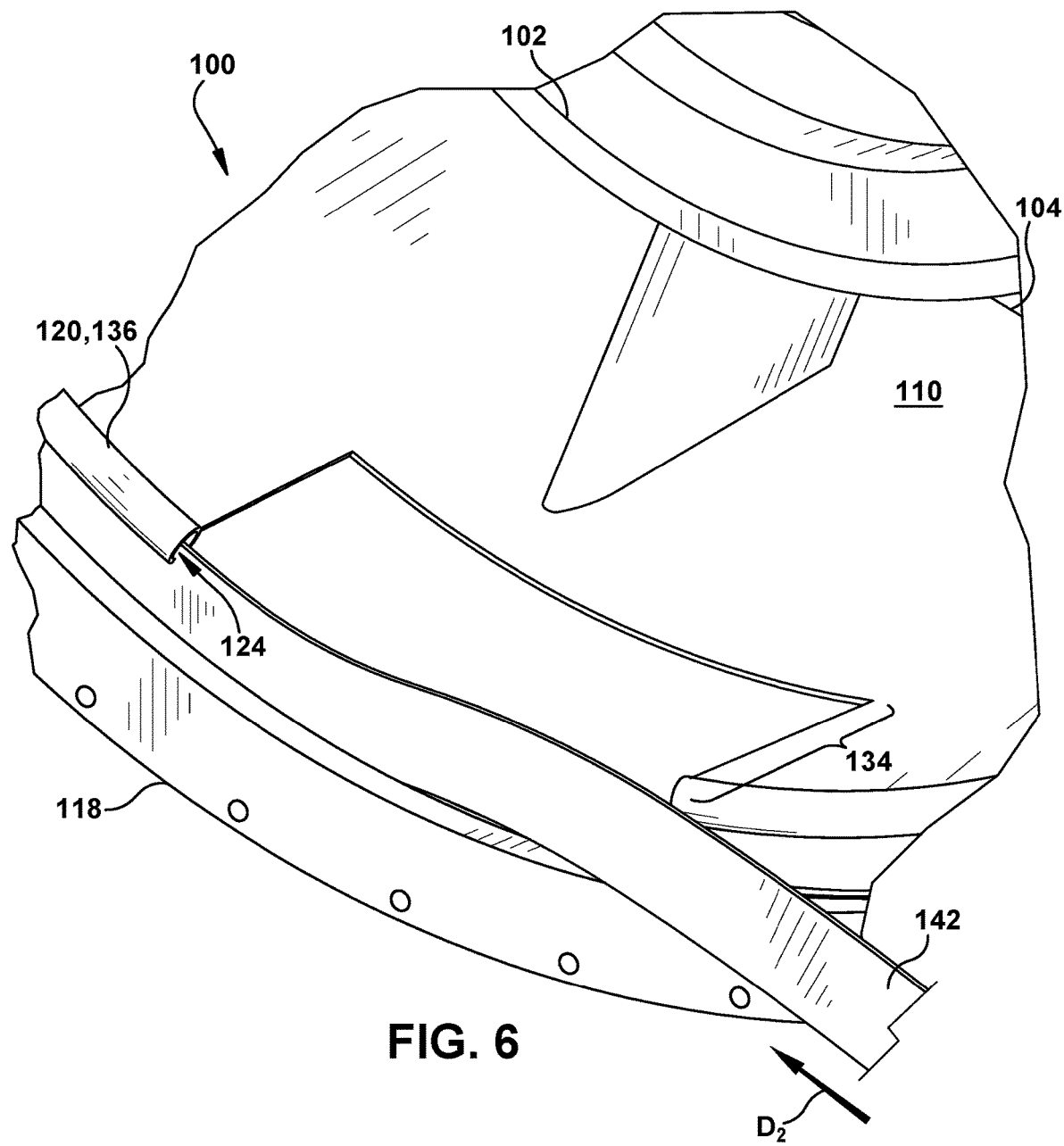
FIG. 6 depicts the bottom portion of the exhaust frame of FIG. 2 including a distinct flex seal of the outer casing being inserted, according to embodiments.

FIG. 6 shows a distinct flex seal 142 being inserted into outer casing 104. Specifically, distinct flex seal 142 may be inserted into outer casing 104 via opening 134 formed within outer casing 104 of exhaust frame 100 to replace previously removed flex seal 122 (see, FIG. 5). As shown in FIG. 6, distinct flex seal 142 may be inserted into outer casing 104 via opening 134 by inserting, pushing and/or feeding distinct flex seal 142 into outer casing 104 in a direction ($D_2$) substantially toward outer casing 104. That is, distinct flex seal 142 may inserted into outer casing 104 by inserting, pushing and/or feeding distinct flex seal 142 in a direction ($D_2$) until the entirety of flex seal 142 moves circumferentially around outer casing 104 and/or between flange 118 and uncut portion 136 of pipe 120, respectively. As shown in FIG. 6, when inserting and/or feeding distinct flex seal 142 into and/or circumferentially around outer casing 104, at least a portion of distinct flex seal 142 may be positioned within or fed through aperture 124 formed in pipe 120. Distinct flex seal 142 may include a seam (not shown) similar to that discussed herein with respect to flex seal 122 in FIG. 4. In a non-limiting example, a first end of distinct flex seal 142 may be inserted into outer casing 104 and/or between flange 118 and pipe 120 and distinct flex seal 142 may be continuously feed circumferentially around outer casing 104 until both ends of distinct flex seal 142 are substantially aligned and/or positioned within opening 134 of outer casing 104. In another non-limiting example, opposite ends of distinct flex seal 142 may be inserted and/or fed through outer casing 104, between flange 118 and pipe 120 until distinct flex seal 142 is positioned within and circumferentially around outer casing 104. In this non-limiting example, the seam (not shown) of distinct flex seal 142 may be positioned elsewhere within outer casing 104 and/or may not be substantially aligned or positioned within opening 134 of outer casing 104.

Figure 7:
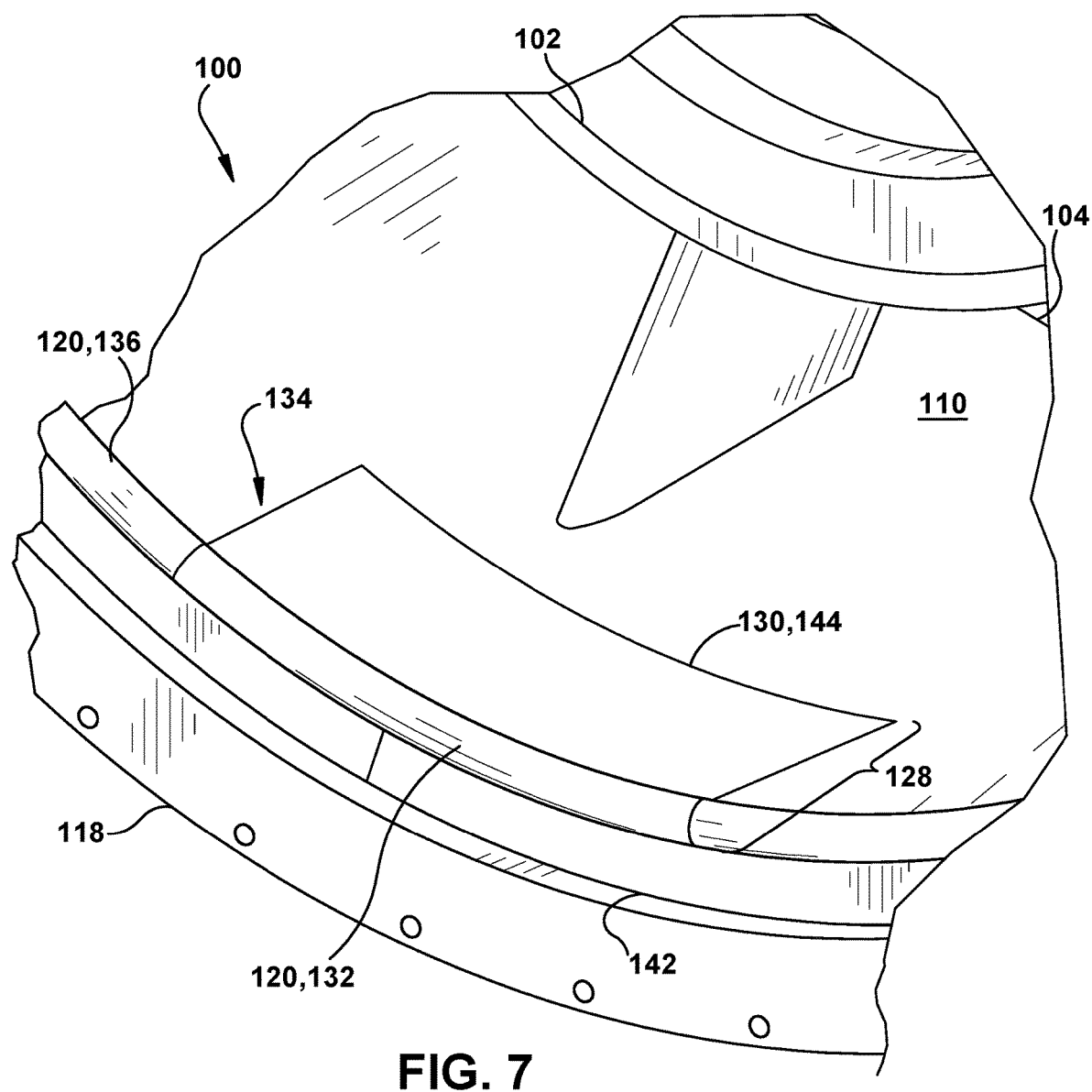
FIG. 7 depicts the bottom portion of the exhaust frame of FIG. 2 including the removed section replaced and the opening covered, according to embodiments.

FIG. 7 shows opening 134 formed within outer casing 104 of exhaust frame 100 substantially covered. In one non-limiting example, section 128 of outer casing 104 previously removed (see, FIG. 4) may be utilized and/or reused to cover opening 134 formed in outer casing 104. Specifically in the non-limiting example, plate 130 and cut portion 132 of pipe 120 may be reattached to outer casing 104 of exhaust frame 100. As shown in FIG. 7, plate 130 may be positioned within a portion of opening 134 and/or positioned in the location of the body, shell or component forming outer casing 104 in which plate 130 was previously formed in and/or removed from. Once positioned within the portion of opening 134 formed within and/or through interior surface 110 of outer casing 104, plate 130 of removed section 128 may then be reattached to the body, shell or component forming outer casing 104. Plate 130 may be reattached, for example, along a similar path and/or within a similar area as cut guide 126 (see, FIGS. 3 and 4). In the non-limiting example shown in FIG. 7, once reattached, plate 130 may be substantially planar with interior surface 110 of outer casing 104.

Plate 130 may be reattached, affixed, and/or coupled to outer casing 104 using any suitable attaching and/or coupling technique. For example, reattaching plate 130 to outer casing 104 may include, but is not limited to brazing plate 130 directly to outer casing 104, welding plate 130 directly to outer casing 104, sintering plate 130 directly to outer casing 104 and so on. In other non-limiting examples discussed herein (see, FIGS. 12 and 13), plate 130 may be releasably coupled to outer casing 104 to cover opening 134.

In another non-limiting example, opening 134 formed within outer casing 104 may at least be partially covered by a prefabricated plate 144. That is, plate 130 formed previously by removing section 128 of outer casing 104 may be discarded once removed, and prefabricated plate 144, distinct from plate 130, may be utilized to cover opening 134 formed within outer casing 104. In the non-limiting example, prefabricated plate 144 may be fabricated based on and/or may include dimensions substantially similar to the dimensions of opening 134 formed within outer casing 104. As similarly discussed herein with respect to the reattaching of plate 130, prefabricated plate 144 may be positioned within a portion of opening 134 and/or positioned in the location of the body, shell or component forming outer casing 104 in which plate 130 was previously formed in and/or removed from. Once positioned within the portion of opening 134 formed within and/or through interior surface 110 of outer casing 104, prefabricated plate 144 may then be reattached to the body, shell or component forming outer casing 104. Also similar to plate 130, prefabricated plate 144 may be reattached, for example, along a similar path and/or within a similar area as cut guide 126 (see, FIGS. 3 and 4), and prefabricated plate 144 may be substantially planar with interior surface 110 of outer casing 104. Prefabricated plate 144 may be reattached, affixed, and/or coupled to outer casing 104 using any suitable attaching and/or coupling technique. For example, reattaching prefabricated plate 144 to outer casing 104 may include, but is not limited to brazing prefabricated plate 144 directly to outer casing 104, welding prefabricated plate 144 directly to outer casing 104, sintering prefabricated plate 144 directly to outer casing 104 and so on. In other non-limiting examples, prefabricated plate 144 may be releasably coupled to outer casing 104 to cover opening 134.

As shown in FIG. 7, cut portion 132 of pipe 120 may also be reattached to outer casing 104. Specifically, cut portion 132 of pipe 120 may be reattached to the remaining or uncut portion 136 of pipe 120. Cut portion 132 of pipe 120 may also receive a portion of distinct flex seal 142 positioned within outer casing 104. That is, prior to being reattached to uncut portion 136 of pipe 120, aperture 124 (see, FIG. 6) formed in cut portion 132 of pipe 120 may receive a portion of distinct flex seal 142 in a similar manner as discussed herein with respect to uncut portion 136 of pipe 120. Once reattached, cut portion 132 of pipe 120 may substantially maintain distinct flex seal 142 in place and/or may substantially cover opening 134 and/or the exposed portion of distinct flex seal 142 that may be exposed or accessible in opening 134. Additionally, reattaching cut portion 132 of pipe 120 to uncut portion 136 may make pipe 120 whole, substantially seamless and/or continuous to seal exhaust frame 100, as discussed herein. Cut portion 132 of pipe 120 may be reattached, affixed, and/or coupled to outer casing 104, and more specifically uncut portion 136 of pipe 120, using any suitable attaching and/or coupling technique. For example, reattaching cut portion 132 of pipe 120 to uncut portion 136 of pipe 120 may include, but is not limited to brazing cut portion 132 of pipe 120 directly to uncut portion 136 of pipe 120, welding cut portion 132 of pipe 120 directly to uncut portion 136 of pipe 120, sintering cut portion 132 of pipe 120 directly to uncut portion 136 of pipe 120, and so on. In other non-limiting examples (not shown), cut portion 132 of pipe 120 may be releasably coupled to uncut portion 136 of pipe 120 to cover opening 134 using similar techniques discussed herein with respect to plate 130 and outer casing 104 (e.g., coupling component). Additionally, although discussed herein as being reutilized or reused, a prefabricated pipe portion (not shown) may be used in place of cut portion 132 of pipe 120, as similarly discussed herein with respect to plate 130 and prefabricated plate 144.

Figure 8:
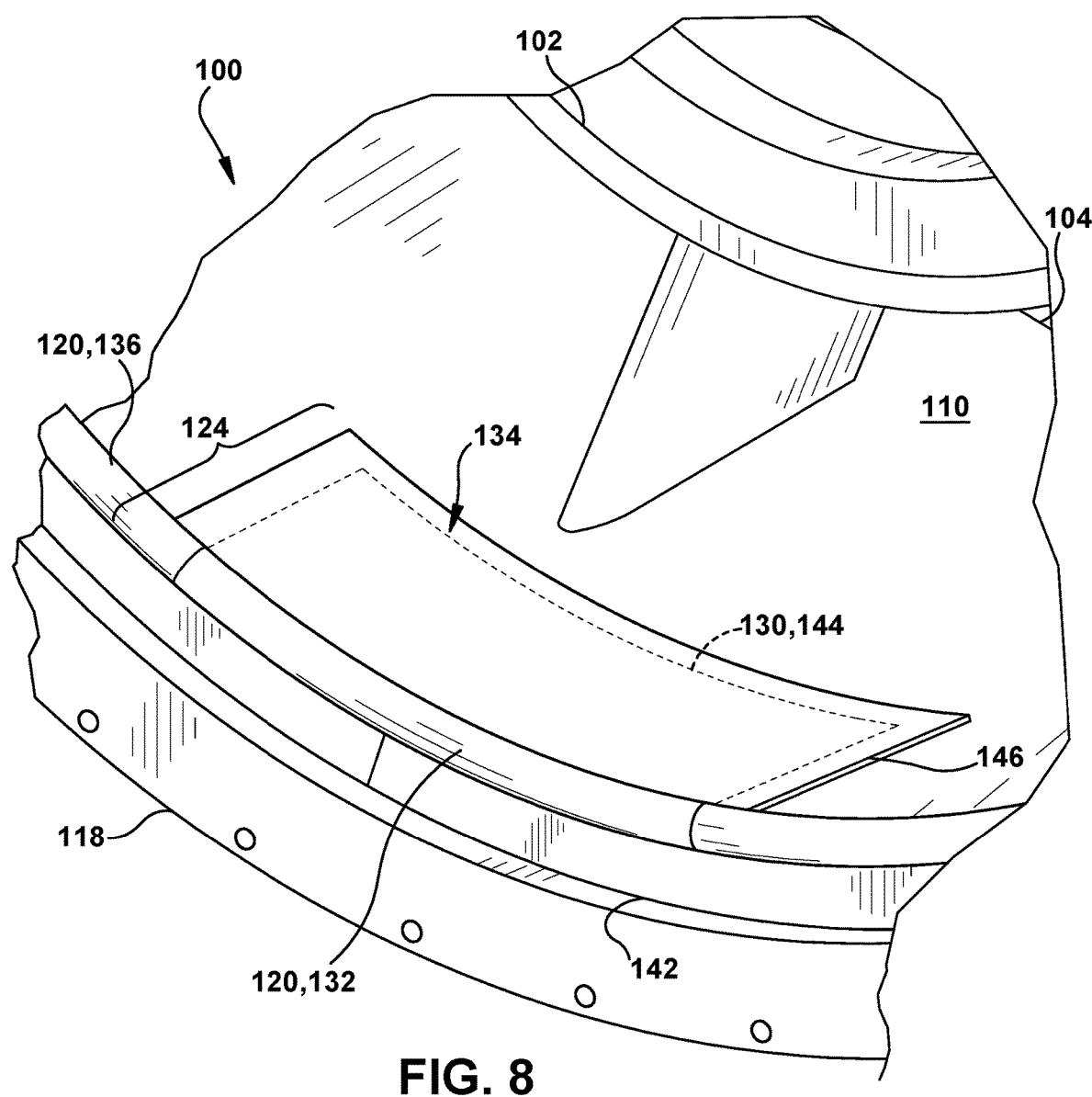
FIGS. 8-10 depict the bottom portion of the exhaust frame of FIG. 2 including at least one distinct plate attached to the removed section and the outer casing, according to embodiments.
Figure 9:
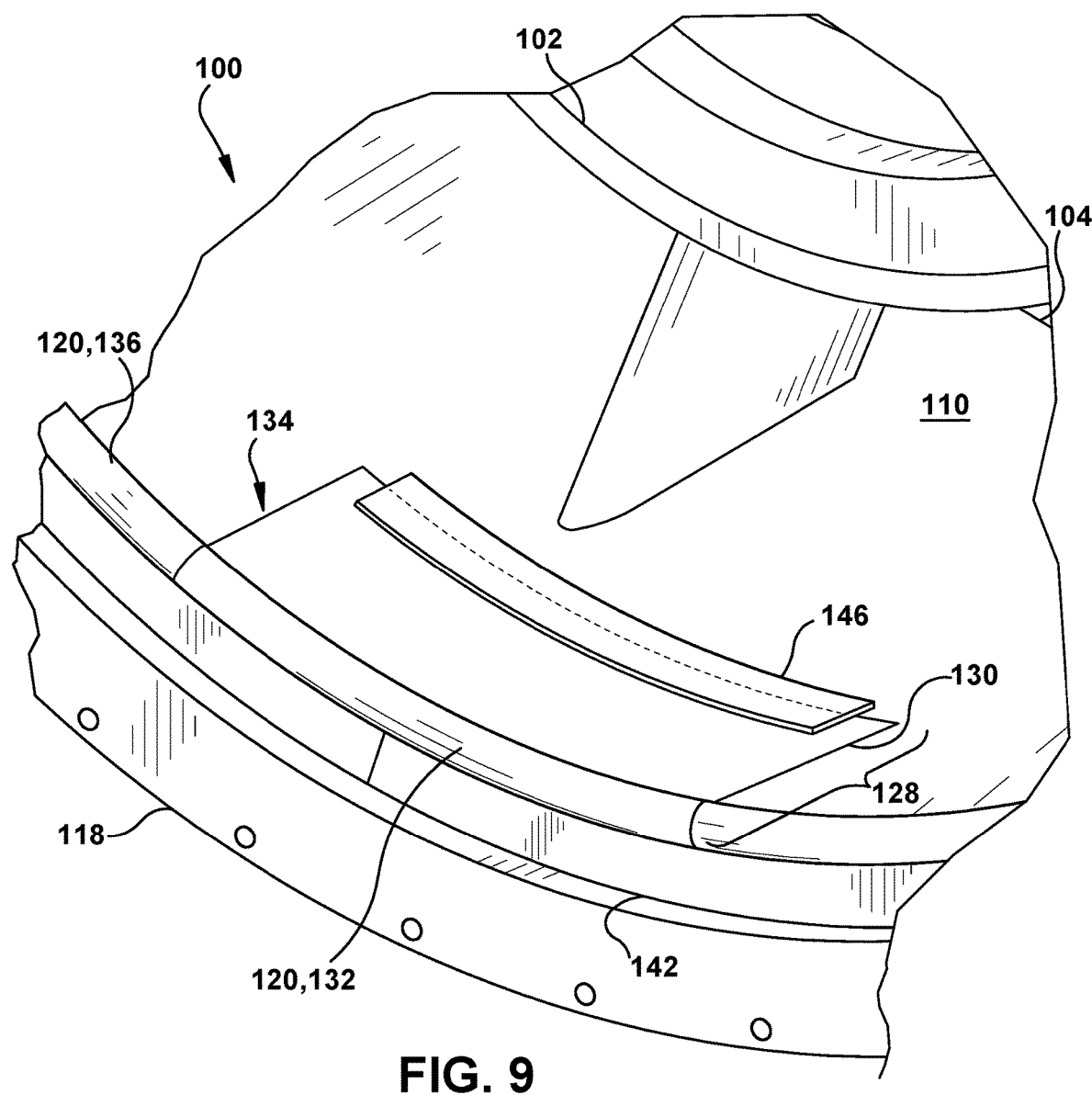
Figure 10:
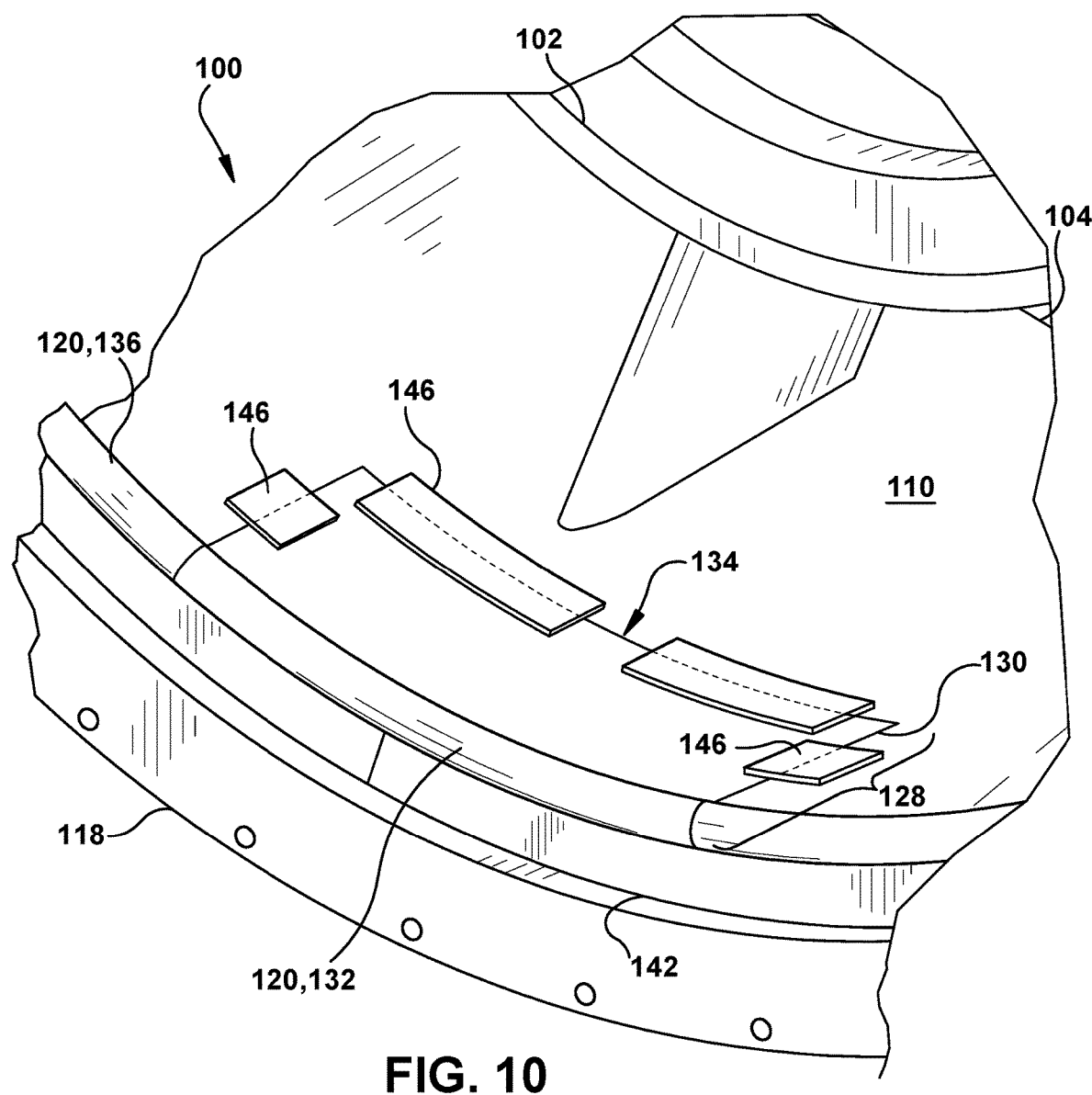

FIGS. 8-10 show additional non-limiting example processes performed after plate 130 or prefabricated plate 144 is reattached or affixed to outer casing 104 of exhaust frame 100 (see, FIG. 7). In the non-limiting example processes, exhaust frame 100 may include at least one distinct plate 146 that may be distinct from plate 130 or prefabricated plate 144. Specifically, FIG. 8 depicts a single distinct plate 146 that may be substantially larger than and/or may substantially cover plate 130 or prefabricated plate 144 and opening 134, respectively. Additionally, FIG. 9 depicts a single distinct plate 146 that may cover only a portion of the coupled interface (e.g., weld) and/or cut line 126 (see, FIGS. 3 and 4) formed between plate 130 or prefabricated 144 and the remaining portion of the shell, component or body of outer casing 104 forming interior surface 110. Further, FIG. 10 depicts a plurality of distinct plates 146 that may cover various portions of the coupled interface (e.g., weld) and/or cut line 126 (see, FIGS. 3 and 4) formed between plate 130 or prefabricated 144 and the remaining portion of the shell, component or body of outer casing 104 forming interior surface 110. Distinct plate(s) 146 may be utilized to aid in covering opening 134 formed within outer casing 104 and/or aid in coupling of plate 130 or prefabricated plate 144 to interior surface 110 of outer casing 104. It is understood that the number of distinct plate(s) 146 shown in the figures is merely illustrative. As such, exhaust frame 100 may include more or less distinct plate(s) 146 than the number depicted and discussed herein.

In the non-limiting examples shown in FIGS. 8-10, distinct plate(s) 146 may be affixed to both plate 130 or prefabricated plate 144, and interior surface 110 of outer casing 104, respectively. That is, distinct plate(s) 146 may be coupled and/or affixed directly to an exposed surface of plate 130 or prefabricated plate 144, and may also be coupled and/or affixed directly to interior surface 110 of outer casing 104. Distinct plate(s) 146 shown in FIGS. 8-10 may be affixed and/or coupled to plate 130 and interior surface 110, respectively, using any suitable attaching and/or coupling technique as discussed herein (e.g., welding, brazing, sintering and so on). In one non-limiting example, distinct plate(s) 146 may be coupled to plate 130 or prefabricated plate 144 after plate 130 or prefabricated plate 144 is reattached to outer casing 104 of exhaust frame 100, as discussed herein (see, FIG. 7). In another non-limiting example, distinct plate(s) 146 may be coupled to plate 130 or prefabricated plate 144 before plate 130 or prefabricated plate 144 is reattached to outer casing 104 of exhaust frame 100. In this non-limiting example, plate 130 or prefabricated plate 144 may cover opening 134 and subsequently be reattached to outer casing 104 with distinct plate 146 coupled or affixed to plate 130 or prefabricated plate 144. As a result of distinct plate(s) 146 being directly coupled to plate 130 or prefabricated plate 144, and interior surface 110, respectively, distinct plate(s) 146 may be radially raised from and/or extend above interior surface 110 of outer casing 104. Distinct plate(s) 146 may be formed from any suitable material that is capable of withstanding the pressures, forces and/or high temperatures exhaust frame 100 is exposed to during operation of turbine system 10 and is capable of being affixed to the various portions of exhaust frame 100, as discussed herein.

Figure 11:
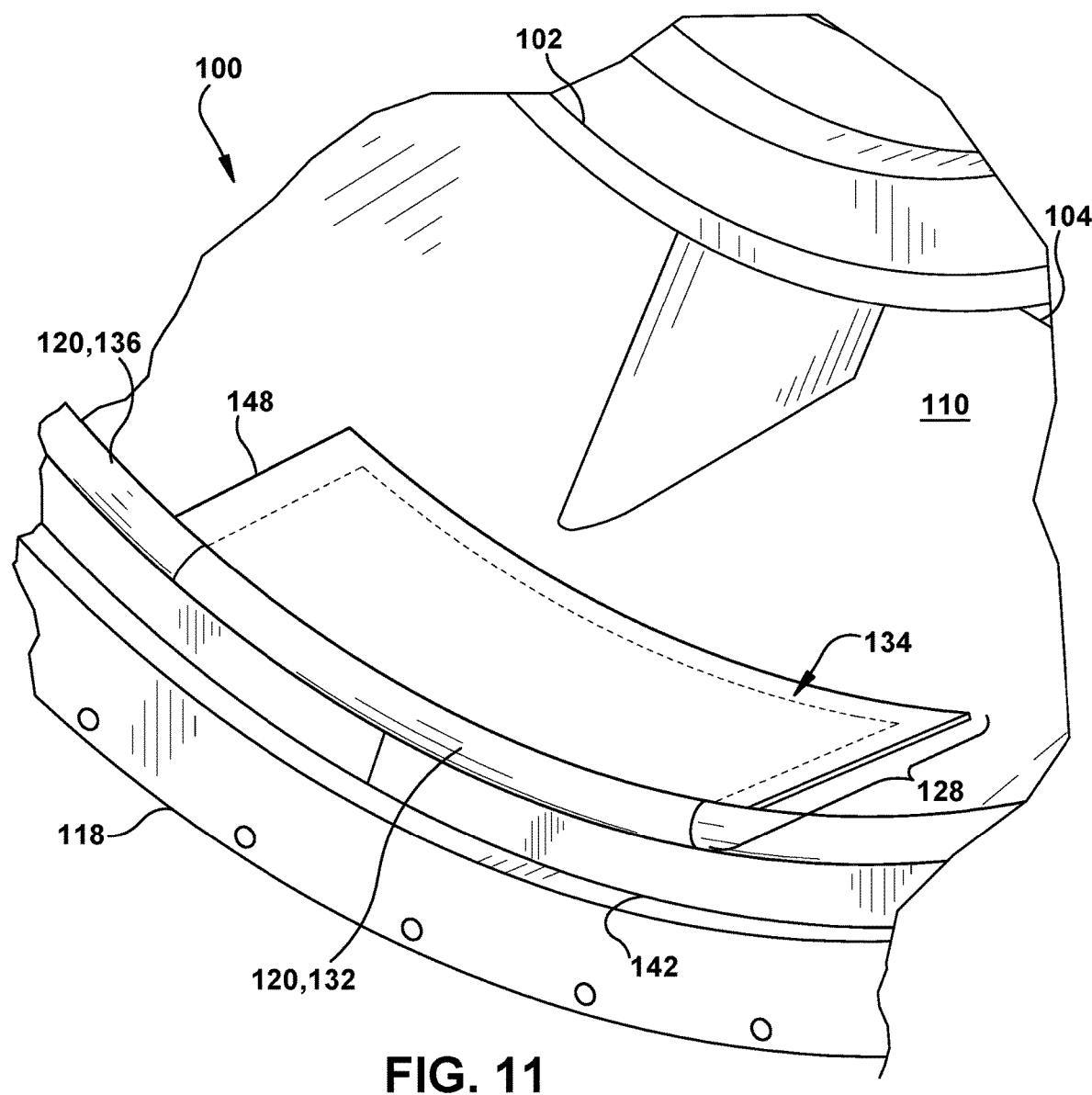
FIG. 11 depicts the bottom portion of the exhaust frame of FIG. 2 including a prefabricated plate covering the opening formed in the outer casing, according to embodiments.

FIG. 11 shows another non-limiting example process for replacing flex seal 122 (see, FIG. 4). Specifically, FIG. 11 depicts a distinct prefabricated plate 148 that may be distinct from and/or used in place of plate 130 or prefabricated plate 144 shown and discussed herein with respect to FIG. 7. Distinct prefabricated plate 148 may include a geometry, shape and/or dimensions that are larger than opening 134 formed within outer casing 104. As such, when utilizing distinct prefabricated plate 148 to cover opening 134 formed within outer casing 104, distinct processes other than those discussed above with respect to FIG. 7 may be performed. That is, distinct prefabricated plate 148 may be attached to outer casing 104 of exhaust frame 100 to cover opening 134, and more specifically, distinct prefabricated plate 148 may be positioned directly on and/or on top of interior surface 110 of outer casing 104 and/or above opening 134, and may subsequently be affixed directly to interior surface 110. Because distinct prefabricated plate 148 is positioned on interior surface 110, distinct prefabricated plate 148 may be radially raised from and/or extend above interior surface 110 of outer casing 104. Distinct prefabricated plate 148 may be affixed and/or coupled to interior surface 110 of outer casing 104 using any suitable attaching and/or coupling technique as discussed herein (e.g., welding, brazing, sintering and so on). Additionally, distinct prefabricated plate 148 may be formed from any suitable material that is capable of withstanding the pressures, forces and/or high temperatures exhaust frame 100 is exposed to during operation of turbine system 10 and is capable of being affixed to interior surface 110 of outer casing 104, as discussed herein.

Figure 12:
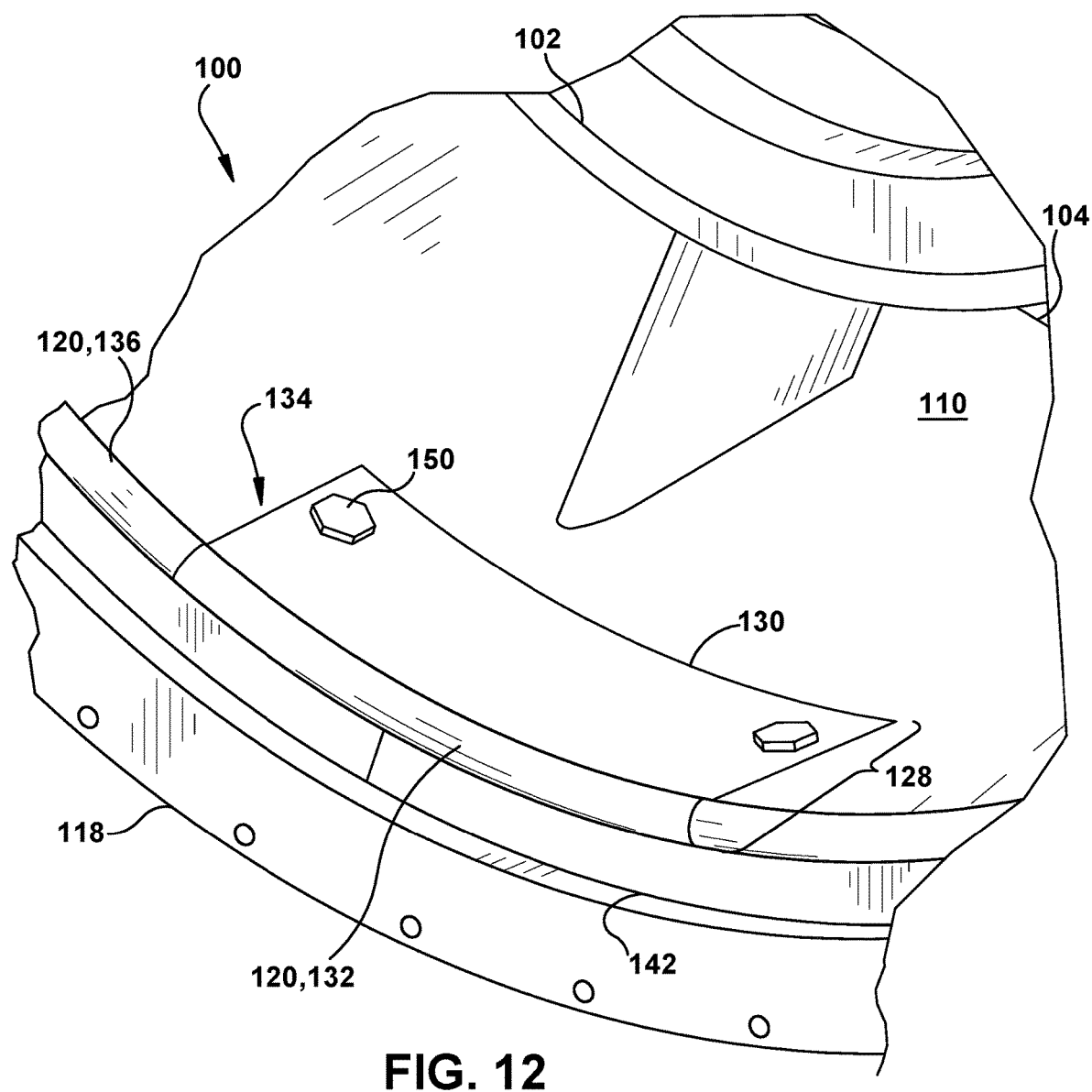
FIG. 12 depicts the bottom portion of the exhaust frame of FIG. 2 including the plate of the removed section releasably coupled to the outer casing to cover the opening formed in the outer casing, according to embodiments.
Figure 13:
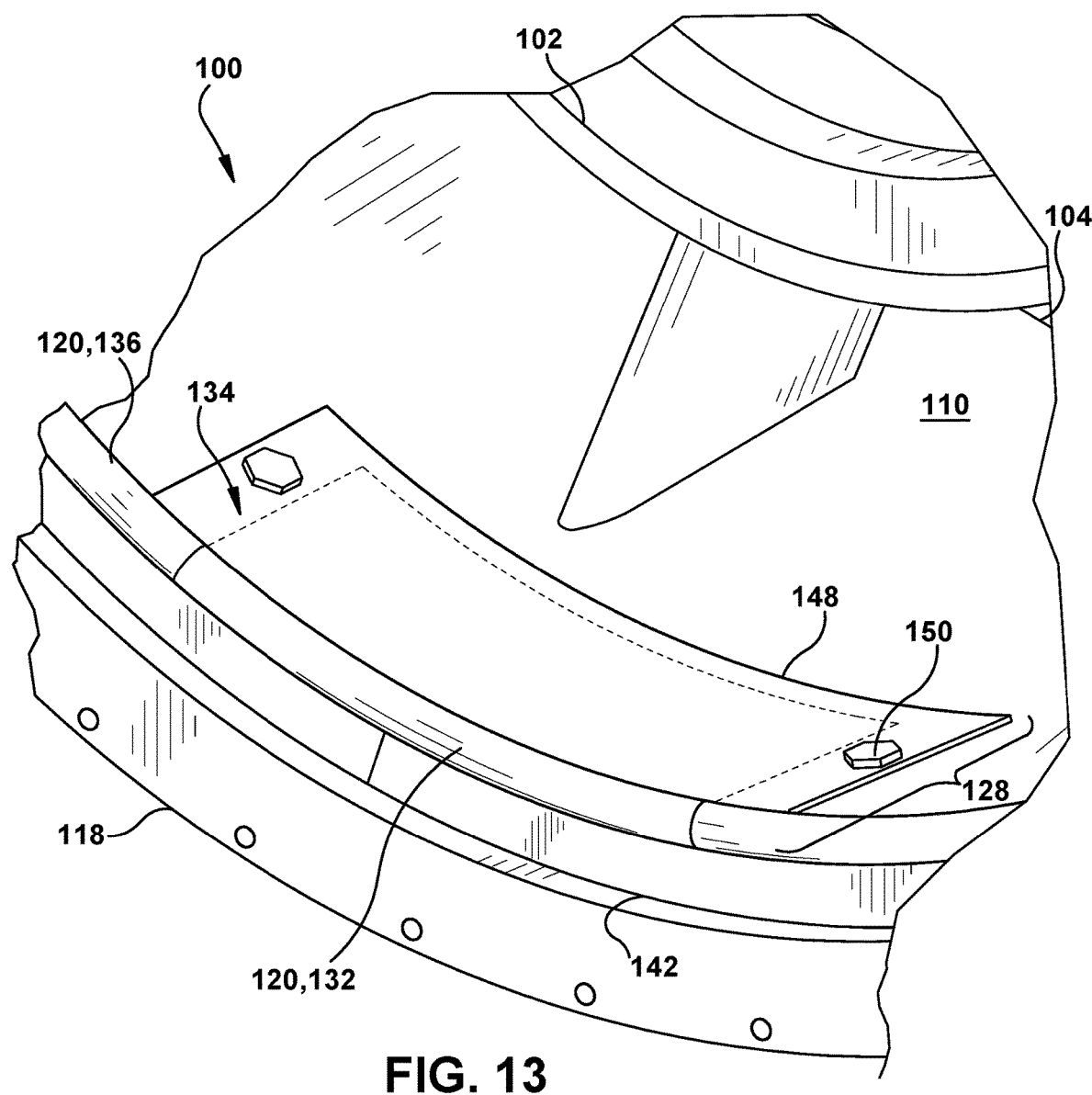
FIG. 13 depicts the bottom portion of the exhaust frame of FIG. 2 including a prefabricated plate of the removed section releasably coupled to the outer casing to cover the opening formed in the outer casing, according to embodiments.

FIGS. 12 and 13 show additional non-limiting examples for covering opening 134 formed within outer casing 104 when replacing flex seal 122 (see, FIG. 4). Specifically, FIG. 12 shows plate 130 or prefabricated plate 144 positioned within opening 134 and releasably coupled to outer casing 104, and FIG. 13 shows distinct prefabricated plate 148 releasably coupled to interior surface 110 of outer casing 104 to cover opening 134. Plate 130 or prefabricated plate 144 (see, FIG. 12) and distinct prefabricated plate 148 (see, FIG. 13) may be releasably coupled to outer casing 104 using releasable coupling component 150 (hereafter, "coupling component 150"). Coupling component 150 may pass through plate 130 or prefabricated plate 144 (see, FIG. 12) and distinct prefabricated plate 148, respectively, and may be releasably coupled directly to outer casing 104. In the non-limiting example shown in FIG. 12, coupling component 150 may releasably couple plate 130 or prefabricated plate 144 within opening 134 to substantially cover opening 134, as discussed herein. In the non-limiting example shown in FIG. 13, coupling component 150 may releasably couple distinct prefabricated plate 148 directly to interior surface 110 of outer casing 104 to substantially cover opening 134, as discussed herein.

Coupling component 150 may be any suitable coupling component configured to releasably couple plate 130 or prefabricated plate 144 and distinct prefabricated plate 148, respectively, to outer casing 104 of exhaust frame 100. For example, coupling component 150 may include screws, bolts, mechanical fasteners, pins and the like. Although not shown, it is understood that outer casing 104 may include a corresponding, mating and/or receiving component (not shown) that may receive and/or mate with coupling component 150 to releasably couple plate 130 or prefabricated plate 144 (see, FIG. 12) and distinct prefabricated plate 148 (see, FIG. 12), respectively, to outer casing 104 of exhaust frame 100. In the non-limiting examples, the corresponding, mating and/or receiving component (not shown) may be formed within opening 134 formed within outer casing 104 (see, FIG. 12), or alternatively, directly through interior surface 110 of outer casing 104 (see, FIG. 13). Apertures through plate 130, prefabricated plate 144 and/or distinct prefabricated plate 148 for receiving coupling component 150, and corresponding, mating and/or receiving component (not shown) formed in outer casing 104, may be formed in the respective components of exhaust frame 100 before or after the formation of opening 134 within outer casing 104.

Although shown as being free and/or uncoupled from shell 34 of turbine 28, it is understood that the processes discussed and shown herein may be performed when exhaust frame 100 is uncoupled from shell 34, or alternatively, may be performed when exhaust frame 100 is still in operational position and/or coupled to shell 34. That is, the processes discussed herein for replacing flex seal 122 may be performed while outer casing 104 of exhaust frame 100 remains coupled to shell 34 of turbine 28. As discussed herein, pipe 120 and interior surface 110 of outer casing 104 may be substantially exposed and/or accessible when outer casing 104 is coupled to shell 34 of turbine 28. As a result, flex seal 122 of outer casing 104 may be replaced without requiring exhaust frame 100 to be removed or uncoupled from shell 34 of turbine 28 and/or manipulated in any way beyond the processes discussed herein.

Additionally, although shown and discussed herein as being performed at a bottom, base and/or lower portion of outer casing 104 of exhaust frame 100, it is understood that the process of replacing flex seal 122 discussed herein with respect to FIGS. 3-13 may be performed in any portion or circumferential position of interior surface 110 of outer casing 104 adjacent flange 118. For example, section 128, plate 130 and/or cut portion 132 of pipe 120 may be removed from a side or a top or upper portion of outer casing 104.

Figure 14:
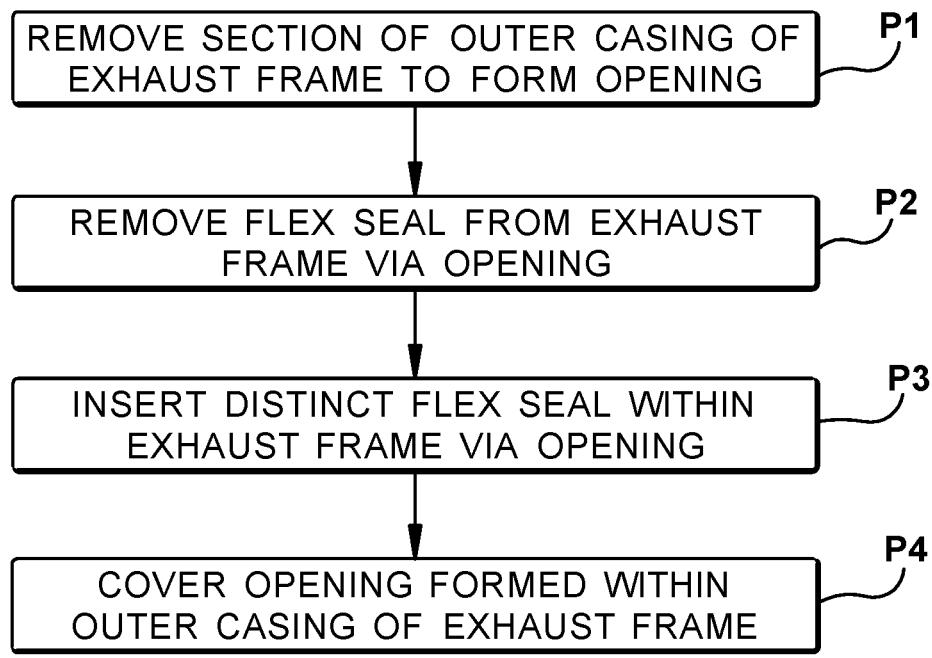
FIG. 14 depicts a flow chart of an example process for replacing a flex seal in an exhaust frame of a turbine system, according to embodiments.

FIG. 14 shows a flow diagram illustrating non-limiting example processes of replacing flex seal 122 in exhaust frame 100 of turbine system 10 (see, FIGS. 1-7). As discussed herein, the processes of replacing flex seal 122 in exhaust frame 100 may be performed while exhaust frame 100 remains coupled to shell 34 of turbine 28. With continued reference to FIGS. 1-13, the processes shown in the flow diagram of FIG. 14 are discussed in detail below.

In process P1, section 128 of outer casing 104 of exhaust frame 100 may be removed. Removal of section 128 may form opening 134 within outer casing 104. Section 128 of outer casing 104 that may be removed may be formed within a flow path (FP) of exhaust frame 100. The removal of section 128 may include cutting interior surface 110 of outer casing 104 of exhaust frame 100 to form plate 130. Interior surface 110 of outer casing 104 may partially define the flow path (FP) of exhaust frame 100. Removal of section 128 may also include cutting a portion 132 of pipe 120 of exhaust frame 100. Pipe 120 may be positioned adjacent interior surface 110 and extend circumferentially around the flow path (FP) of exhaust frame 100. Further, the removal of section 128 may include removing plate 130 and cut portion 132 of pipe 120 from outer casing 104 of exhaust frame 100.

In process P2, existing flex seal 122 may be removed from exhaust frame 100. Specifically, flex seal 122 may be removed from outer casing 104 of exhaust frame 100 via opening 134 formed within outer casing 104. Flex seal 122 may be removed by moving flex seal 122 circumferentially around outer casing 104 and/or pulling flex seal 122 out of and/or away from outer casing 104.

In process P3, distinct flex seal 142 may be inserted into exhaust frame 100. Specifically, distinct flex seal 142 may be inserted into and/or positioned substantially around outer casing 104 and/or the flow path (FP) of exhaust frame 100. Distinct flex seal 142 may be inserted within exhaust frame 100 via opening 134 formed within outer casing 104. Distinct flex seal 122 may be inserted into outer casing 104 by moving distinct flex seal 142 circumferentially around outer casing 104 and/or pushing distinct flex seal 142 into and/or toward outer casing 104 of exhaust frame 100. Inserting distinct flex seal 142 into exhaust frame 100 may also include feeding distinct flex seal 142 around outer casing 104 between flange 118 of outer casing 104 and pipe 120. When feeding distinct flex seal 142 around casing 104, at least a portion of distinct flex seal 142 may be fed through an aperture 124 formed in pipe 120 and/or may be positioned within or partially surrounded by pipe 120.

In process P4, opening 134 formed within outer casing 104 of exhaust frame 100 may be covered. That is, opening 134 formed within outer casing 104 during process P1 may be covered after flex seal 122 is removed (see, process P2) and replaced with distinct flex seal 142 (see, process P3). Covering opening 134 may include reattaching plate 130 to outer casing 104 of exhaust frame 100 and reattaching cut portion 132 of pipe 120 to uncut portion 136 of pipe 120 of exhaust frame 100. Reattaching plate 130 may include brazing plate 130 directly to outer casing 104, welding plate 130 directly to outer casing 104, sintering plate 130 directly to outer casing 104 and/or releasably coupling plate 130 directly to outer casing 104 and within opening 134. Reattaching cut portion 132 of pipe 120 may include brazing cut portion 132 of pipe 120 directly to uncut portion 136 of pipe 120, welding cut portion 132 of pipe 120 directly to uncut portion 136 of pipe 120, sintering cut portion 132 of pipe 120 directly to uncut portion 136 of pipe 120 and/or releasably coupling cut portion 132 of pipe 120 directly to uncut portion 136 of pipe 120. In another non-limiting example, covering opening 134 may include affixing at least one distinct plate 146 to plate 130 cut from interior surface 110 of outer casing 104, and affixing distinct plate(s) 146 directly to interior surface 110 of outer casing 104.

In further non-limiting examples, covering opening 134 in process P4 may include attaching prefabricated plate 144, 148 to outer casing 104 of exhaust frame 100. Prefabricated plate 144, 148 may be distinct from removed section 128, and specifically plate 130, of outer casing 104. Attaching prefabricated plate 144, 148 may include one of positioning prefabricated plate 144 within opening 134, or alternatively, positioning prefabricated plate 148 directly on interior surface 110 of outer casing 104, above opening 134. In the example where prefabricated plate 148 is positioned directly on interior surface 110 of outer casing 104 and above opening 134, prefabricated plate 148 may include a geometry, shape and/or dimension that is larger than opening 134 to completely cover opening 134. Attaching or affixing prefabricated plate 144, 148 may also include brazing prefabricated plate 144, 148 directly to outer casing 104 or interior surface 110, welding prefabricated plate 144, 148 directly to outer casing 104 or interior surface 110, sintering prefabricated plate 144, 148 directly to outer casing 104 or interior surface 110, and/or releasably coupling prefabricated plate 144, 148 directly to outer casing 104 or interior surface 110.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for replacing a flex seal, comprising:
   removing a section of an outer casing of an exhaust frame to form an opening within the outer casing, the section formed within a flow path of the exhaust frame;
   removing the flex seal from the exhaust frame via the opening formed within the outer casing;
   inserting a distinct flex seal within the exhaust frame via the opening formed within the outer casing; and
   covering the opening formed within the outer casing of the exhaust frame;
   wherein removing the section of the exhaust frame includes:
     cutting an interior surface of the outer casing of the exhaust frame to form a plate, the interior surface of the outer casing partially defining the flow path of the exhaust frame;
     cutting a portion of a pipe of the exhaust frame, the pipe positioned adjacent the interior surface of the outer casing and extending circumferentially around the flow path of the exhaust frame; and
     removing the plate and the cut portion of the pipe from the outer casing of the exhaust frame;
   and
   wherein covering the opening includes:
     reattaching the plate to the outer casing of the exhaust frame, the reattached plate planar with the interior surface of the outer casing; and
     reattaching the cut portion of the pipe to an uncut portion of the pipe of the exhaust frame.

2. The method of claim 1, wherein inserting the distinct flex seal within the exhaust frame includes:
   feeding the distinct flex seal around the outer casing of the exhaust frame, at least a portion of the distinct flex seal fed through an aperture formed in the pipe.

3. The method of claim 1, wherein reattaching the plate to the outer casing of the exhaust frame includes at least one of:
   brazing the plate directly to the outer casing of the exhaust frame,
   welding the plate directly to the outer casing of the exhaust frame, or
   releasably coupling the plate directly to the outer casing of the exhaust frame.

4. The method of claim 1, wherein reattaching the cut portion of the pipe to the uncut portion of the pipe includes at least one of:
   brazing the cut portion of the pipe directly to the uncut portion of the pipe,
   welding the cut portion of the pipe directly to the uncut portion of the pipe, or
   releasably coupling the cut portion of the pipe directly to the uncut portion of the pipe.

* * * * *